US009323312B2

(12) United States Patent
Menard et al.

(10) Patent No.: US 9,323,312 B2
(45) Date of Patent: Apr. 26, 2016

(54) SYSTEM AND METHODS FOR DELAYING INTERRUPTS IN A MICROCONTROLLER SYSTEM

(71) Applicant: Atmel Corporation, San Jose, CA (US)

(72) Inventors: Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 292 days.

(21) Appl. No.: 13/789,902

(22) Filed: Mar. 8, 2013

(65) Prior Publication Data

US 2014/0089708 A1    Mar. 27, 2014

Related U.S. Application Data

(60) Provisional application No. 61/703,998, filed on Sep. 21, 2012.

(51) Int. Cl.
*G06F 1/32*        (2006.01)
(52) U.S. Cl.
CPC ............ *G06F 1/3234* (2013.01); *G06F 1/3203* (2013.01); *G06F 1/3296* (2013.01); *Y02B 60/1285* (2013.01); *Y02B 60/32* (2013.01)
(58) Field of Classification Search
CPC ... G06F 1/3203; G06F 1/3215; G06F 9/4403; G06F 13/24; G06F 1/32; G06F 1/3206; H04N 1/00896
USPC ........................................................ 713/323
See application file for complete search history.

(56) References Cited

U.S. PATENT DOCUMENTS

| | | | |
|---|---|---|---|
| 4,475,134 A * | 10/1984 | Bowden et al. | 360/69 |
| 4,677,566 A | 6/1987 | Whittaker et al. | |
| 4,703,486 A | 10/1987 | Bemis | |
| 5,579,498 A * | 11/1996 | Ooi | 712/245 |
| 5,623,234 A | 4/1997 | Shaik et al. | |
| 6,163,851 A | 12/2000 | Yamazoe et al. | |
| 6,175,891 B1 | 1/2001 | Norman et al. | |
| 6,255,878 B1 * | 7/2001 | Gauvin et al. | 327/263 |
| 6,320,717 B1 | 11/2001 | Feng | |
| 6,393,080 B1 * | 5/2002 | Kamoshida et al. | 375/354 |
| 6,462,830 B1 * | 10/2002 | Negishi | 358/1.12 |
| RE38,108 E | 5/2003 | Chee | |
| 6,754,836 B2 | 6/2004 | Shimizue et al. | |
| 6,848,055 B1 * | 1/2005 | Yarch | 713/300 |
| 7,203,855 B2 | 4/2007 | Chou | |

(Continued)

OTHER PUBLICATIONS

Non-Final Office Action dated Apr. 9, 2015; U.S. Appl. No. 13/788,366, filed Mar. 7, 2013, 15 pages.

(Continued)

*Primary Examiner* — Thomas Lee
*Assistant Examiner* — Santosh R Poudel
(74) *Attorney, Agent, or Firm* — Fish & Richardson P.C.

(57) ABSTRACT

A microcontroller system includes a power manager that is configured to, during a power saving mode, configure an interrupt delaying module to receive and hold an interrupt from an interrupt source. In response to receiving the interrupt from the interrupt source, the power manager causes the microcontroller system to exit the power saving mode. Upon exiting the power saving mode, the power manager configures the interrupt delaying module to release the interrupt.

20 Claims, 4 Drawing Sheets

(56) References Cited

U.S. PATENT DOCUMENTS

| | | | |
|---|---|---|---|
| 7,391,250 B1* | 6/2008 | Chuang | 327/211 |
| 7,444,530 B2* | 10/2008 | Deppe | H02J 9/005 |
| | | | 348/734 |
| 7,514,958 B1 | 4/2009 | Zhou | |
| 7,574,683 B2 | 8/2009 | Wilson et al. | |
| 7,770,142 B1 | 8/2010 | Shmayovitsh | |
| 7,895,458 B2 | 2/2011 | Kim | |
| 7,954,078 B1 | 5/2011 | Wang | |
| 7,984,317 B2 | 7/2011 | Conroy | |
| 8,190,931 B2 | 5/2012 | Laurenti et al. | |
| 8,255,722 B2 | 8/2012 | Pedersen et al. | |
| 8,683,419 B1 | 3/2014 | Hines | |
| 8,791,743 B1 | 7/2014 | Tang | |
| 2003/0006807 A1* | 1/2003 | Masuda et al. | 327/99 |
| 2003/0177404 A1 | 9/2003 | Jorgenson et al. | |
| 2003/0183024 A1* | 10/2003 | Lohberg et al. | 73/865.9 |
| 2003/0198108 A1* | 10/2003 | Hausmann et al. | 365/200 |
| 2004/0148548 A1 | 7/2004 | Moyer | |
| 2004/0158773 A1 | 8/2004 | Kang | |
| 2005/0083081 A1* | 4/2005 | Jacobson et al. | 326/93 |
| 2007/0260794 A1* | 11/2007 | Ashish et al. | 710/267 |
| 2008/0072094 A1* | 3/2008 | Hayano et al. | 713/400 |
| 2008/0189455 A1 | 8/2008 | Dreps et al. | |
| 2008/0211559 A1* | 9/2008 | Tanaka | 327/225 |
| 2009/0089607 A1* | 4/2009 | Rodriguez | G06F 1/26 |
| | | | 713/340 |
| 2009/0089725 A1 | 4/2009 | Khan | |
| 2009/0135751 A1 | 5/2009 | Hodges | |
| 2009/0153210 A1 | 6/2009 | Wang et al. | |
| 2009/0204835 A1 | 8/2009 | Smith et al. | |
| 2009/0256607 A1 | 10/2009 | Smith et al. | |
| 2009/0259863 A1* | 10/2009 | Williams et al. | 713/323 |
| 2010/0064160 A1* | 3/2010 | Wilson | G06F 1/3203 |
| | | | 713/324 |
| 2010/0156458 A1* | 6/2010 | Speers | 326/39 |
| 2010/0192115 A1 | 7/2010 | Yang | |
| 2010/0306570 A1* | 12/2010 | Uchida et al. | 713/600 |
| 2011/0060931 A1 | 3/2011 | Radhakrishnan | |
| 2011/0131427 A1 | 6/2011 | Jorgenson et al. | |
| 2011/0138200 A1* | 6/2011 | Tomizawa | 713/310 |
| 2011/0208888 A1* | 8/2011 | Park | 710/267 |
| 2011/0221483 A1* | 9/2011 | Liu et al. | 327/142 |
| 2011/0252251 A1 | 10/2011 | De Cesare et al. | |
| 2011/0264902 A1 | 10/2011 | Hollingworth | |
| 2012/0017099 A1 | 1/2012 | David | |
| 2012/0047402 A1* | 2/2012 | Chen et al. | 714/38.13 |
| 2012/0120958 A1* | 5/2012 | Mahadevan et al. | 370/392 |
| 2012/0268995 A1 | 10/2012 | Sugimoto et al. | |
| 2013/0063114 A1* | 3/2013 | Agrawal et al. | 323/283 |
| 2013/0067250 A1* | 3/2013 | Wu et al. | 713/300 |
| 2013/0073878 A1 | 3/2013 | Jayasimha et al. | |
| 2013/0097445 A1 | 4/2013 | Palaniappan et al. | |
| 2013/0124895 A1 | 5/2013 | Saha et al. | |
| 2013/0339589 A1 | 12/2013 | Qawami et al. | |
| 2014/0089706 A1 | 3/2014 | Menard et al. | |
| 2014/0089707 A1 | 3/2014 | Jouin et al. | |
| 2014/0089714 A1 | 3/2014 | Pedersen et al. | |
| 2014/0122833 A1 | 5/2014 | Davis | |
| 2014/0281648 A1 | 9/2014 | Russell et al. | |
| 2014/0301152 A1 | 10/2014 | Cox et al. | |
| 2015/0082093 A1 | 3/2015 | Sarangi | |
| 2015/0095681 A1 | 4/2015 | Jouin et al. | |
| 2015/0220678 A1 | 8/2015 | Srivastava | |
| 2015/0378423 A1 | 12/2015 | Hanssen | |

OTHER PUBLICATIONS

Non-Final Office Action dated Mar. 12, 2015, U.S. Appl. No. 13/786,042, filed Mar. 5, 2013 (14 pages).

U.S. Appl. No. 13/785,999, non-final office action dated Mar. 25, 2015, 12 pages.

US Non-Final Office Action in U.S. Appl. No. 12/400,690, dated Sep. 12, 2011, 7 pages.

US Final Office Action in U.S. Appl. No. 12/400,690, dated Jan. 11, 2012, 7 pages.

US Notice of Allowance in U.S. Appl. No. 12/400,690, dated May 9, 2012, 6 pages.

US Notice of Allowance in U.S. Appl. No. 13/785,999, dated Sep. 10, 2015, 16 pages.

US Non-Final Office Action in U.S. Appl. No. 14/043,445, dated Aug. 25, 2015, 12 pages.

US Final Office Action in U.S. Appl. No. 13/786,042, dated Sep. 10, 2015, 13 pages.

US Notice of Allowance in U.S. Appl. No. 13/788,366, dated Oct. 13, 2015, 20 pages.

* cited by examiner

SYSTEM AND METHODS FOR DELAYING INTERRUPTS IN A MICROCONTROLLER SYSTEM

CROSS-REFERENCE TO RELATED APPLICATIONS

This application claims the benefit and priority of U.S. Provisional Application Ser. No. 61/703,998, filed Sep. 21, 2012, the entire contents of which is hereby incorporated by reference.

TECHNICAL FIELD

This disclosure relates generally to electronics and more particularly to microcontroller systems.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes. Clocked peripheral modules in the microcontroller system are typically unavailable in ultra-low power, unclocked sleep modes, forcing applications to rely on higher-power clocked modes.

Conventional power reduction solutions for saving power in a microcontroller require that the clock to the Central Processing Unit (CPU) or peripheral modules be switched off, typically by implementing one or more sleep modes in the microcontroller. This solution can be extended until all clocks and analog modules have been switched off, and only leakage current remains, which is typically several orders of magnitude less than active current. The disadvantage of this conventional approach is that the functionality of the device is reduced, since some peripherals are designed to operate with a clock running

SUMMARY

A microcontroller system includes a power manager that is configured to, during a power saving mode, configure an interrupt delaying module to receive and hold an interrupt from an interrupt source. In response to receiving the interrupt from the interrupt source, the power manager causes the microcontroller system to exit the power saving mode. Upon exiting the power saving mode, the power manager configures the interrupt delaying module to release the interrupt.

Particular implementations of the microcontroller system can provide one or more of the following advantages: 1) the startup sequence of the microcontroller in response to an interrupt signal can be controlled with changing the design of interrupt sources or an interrupt controller; 2) the startup sequence can be controller without software intervention; 3) both synchronous and asynchronous interrupts can be supported; 4) interrupt propagation during a sleep mode is not changed or degraded; and 5) there is no metastability issue for a module eventually receiving the interrupt.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
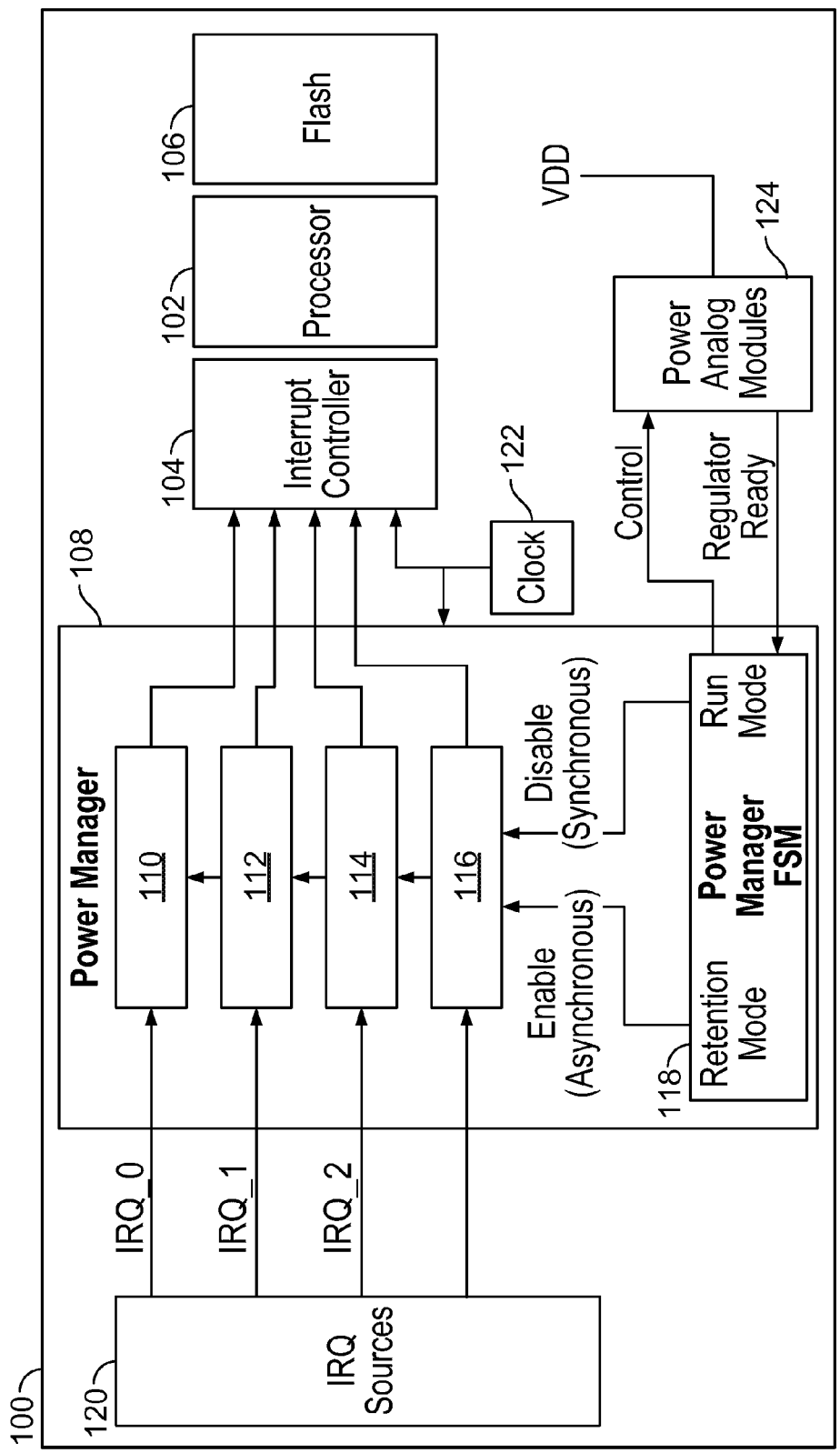
FIG. 1 is a schematic diagram of an example microcontroller system.

FIG. 1 is a schematic diagram of an example microcontroller system 100 including a processor 102 (e.g., a central processing unit), an interrupt controller 104, a flash memory module 106, a power manager 108, and one or more interrupt sources 120 (e.g., peripheral modules) that can provide interrupt signals to the interrupt controller 104. The power manager includes a respective interrupt delaying module 110, 112, 114, and 116 for each of the interrupt sources and a control circuit 108 implementing a power manager finite state machine 118. The microcontroller system also includes a clock 122 and one or more power analog modules 124.

The power manager can configure the microcontroller system to operate in a run mode and one or more low power modes, for example, a retention mode and a sleep mode. In the sleep mode, the processor is frozen, e.g., by clock gating, and the internal voltage value (VDD) is the same as it is in the run mode.

In the retention mode, VDD is lower than in the run mode, which is useful, for example, to reduce leakage current. The reduced VDD is sufficiently large for some or all of the logic cells in the microcontroller system to retain logic values. Also, in the retention mode, the clock is frozen and a voltage regulator is drawing a limited output current.

When the power manager wakes the microcontroller system from the retention mode, there may be a delay in restoring VDD to its full value in the run mode. One or more of the power analog modules may be able to operate using the lower VDD while the microcontroller system is waking, but typically the processor (and perhaps other modules, e.g., the flash memory) are configured to wait until one or more of the power analog modules (e.g., the regulator) are stabilized and the full VDD is available.

For example, when one of the interrupt sources issues an interrupt, the startup time for some functionality of the microcontroller system can be reduced by configuring the power analog modules to start operating immediately in response to the interrupt and configuring the processor to wait. The power manager can implement this startup sequence using the interrupt delaying modules, while avoiding modifying the interrupt controller or the interrupt sources. By using the interrupt delaying module, the power manager can implement this startup sequence for both synchronous and asynchronous interrupt sources.

In operation, the power manager configures an interrupt delaying module to receive and hold an interrupt from an interrupt source while the microcontroller is in the retention mode. In response to receiving the interrupt, the power manager causes the microcontroller system to exit the retention mode. In some implementations, the microcontroller system only partially exits the retention mode, e.g., the power analog modules can be enabled while some other modules remain in the retention mode because a power source is not yet stabilized. When the power analog modules indicate that the power is ready, e.g., via a regulator ready signal, the power manager configures the interrupt delaying module to propagate the interrupt to the interrupt controller. Then the processor can be enabled and will be able to fetch code from the flash module.

Example Interrupt Delaying Module

Figure 2:
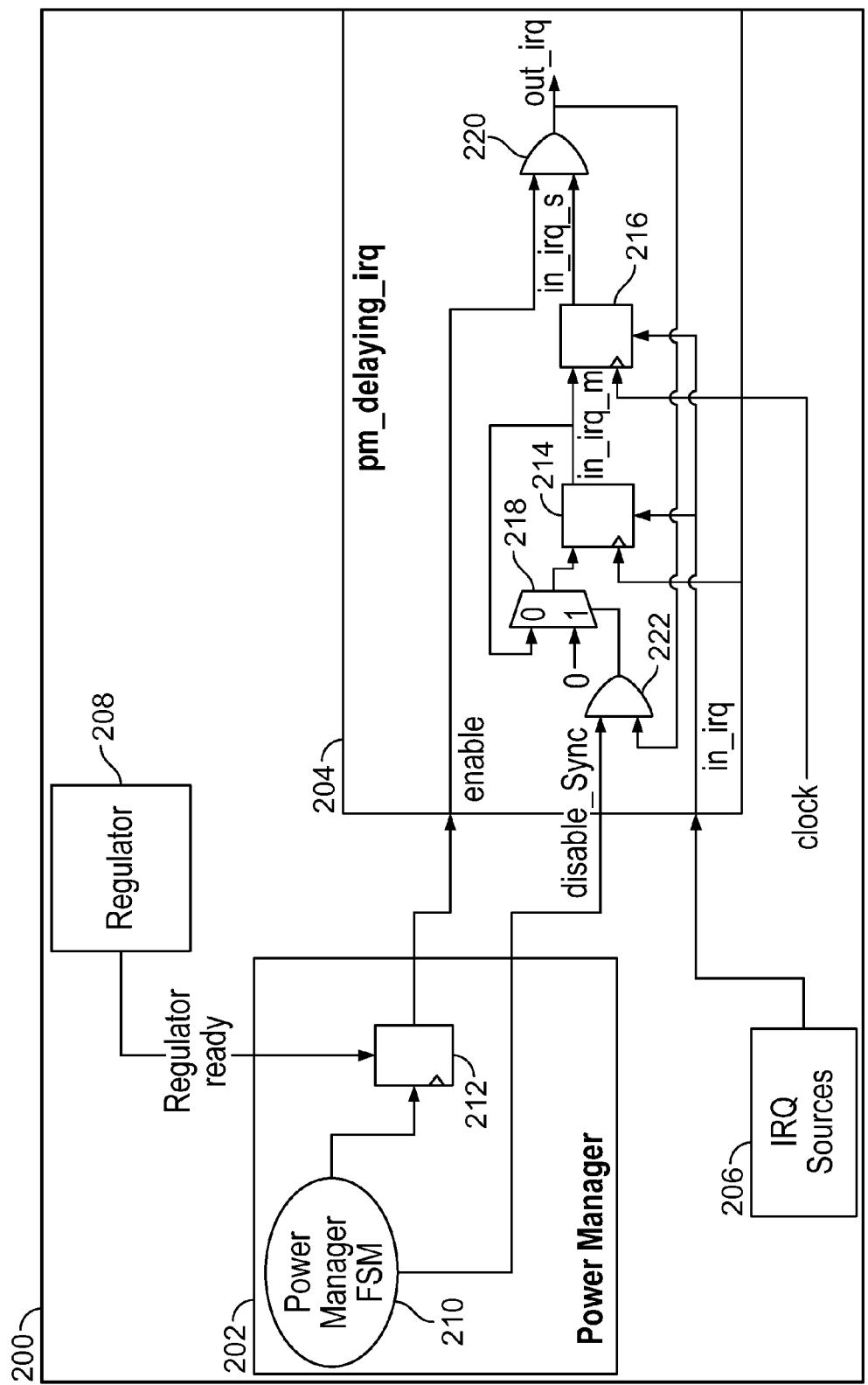
FIG. 2 is a schematic diagram of an example interrupt delaying module of a microcontroller system.

FIG. 2 is a schematic diagram of an example interrupt delaying module 204 of a microcontroller system 200. The microcontroller system also includes a power manager 202, one or more interrupt sources 206, and a regulator 208.

The power manager includes a finite state machine 210 and a flip-flop 212, e.g., a D flip flop. The flip-flop receives an asynchronous regulator ready signal from the regulator, indicating the regulator is supply a target voltage or a substantial fraction of the target voltage. The flip flop also receives a signal from the power manage finite state machine indicating whether the microcontroller system is in the retention mode or not.

The interrupt delaying module includes first and second flip-flops 214 and 216, e.g., D flip-flops, a multiplexer 218, and first and second AND gates 220 and 222. A clock is connected to a clock input of each of the first and second flip-flops. The output of the flip-flop 212 of the power manager is coupled to an input of the first AND gate 220 and function as an asynchronous "enable" signal that causes the interrupt delaying module to hold an interrupt. The enable signal is asynchronously set to logic "1" when the regulator is ready. The enable signal is synchronously cleared when the power manager finite state machine indicates that the system is in retention mode.

The power manager finite state machine provides a synchronous output "disable_sync" signal to an input of the second AND gate 222 that causes the interrupt delaying module to release an interrupt or bypass other incoming interrupts. The disable_sync signal is set to logic "1" when the power manager finite state machine is in run mode. The disable_sync signal is cleared when the power manager finite state machine is not in run mode.

The interrupt source is coupled to the "asynchronous set" of inputs of each of the first and second flip-flops and provides an interrupt as an "in_irq" signal. The in_irq signal can be set asynchronously and cleared synchronously. An output of the first flip-flop 214 is coupled to an input of the second flip-flop 216 and to an input of the multiplexer.

An output of the second flip-flop 216 is coupled to another input of the first AND gate 220. An output of the multiplexer is coupled to another input of the first flip-flop 214. Another input of the multiplexer is coupled to a voltage representing logical "0." A selector input of the multiplexer is coupled to the output of the second AND gate 222, which controls whether the multiplexer outputs the logical "0" or the value at the other input of the multiplexer.

The output of the first AND gate 220 provides the output interrupt as an "out_irq" signal. The output of the first AND gate 220 is also coupled to an input of the second AND gate 222. The operation of the microcontroller system will be described with reference to the example timing diagram of FIG. 3.

Timing Diagram of Example Scenario

Figure 3:
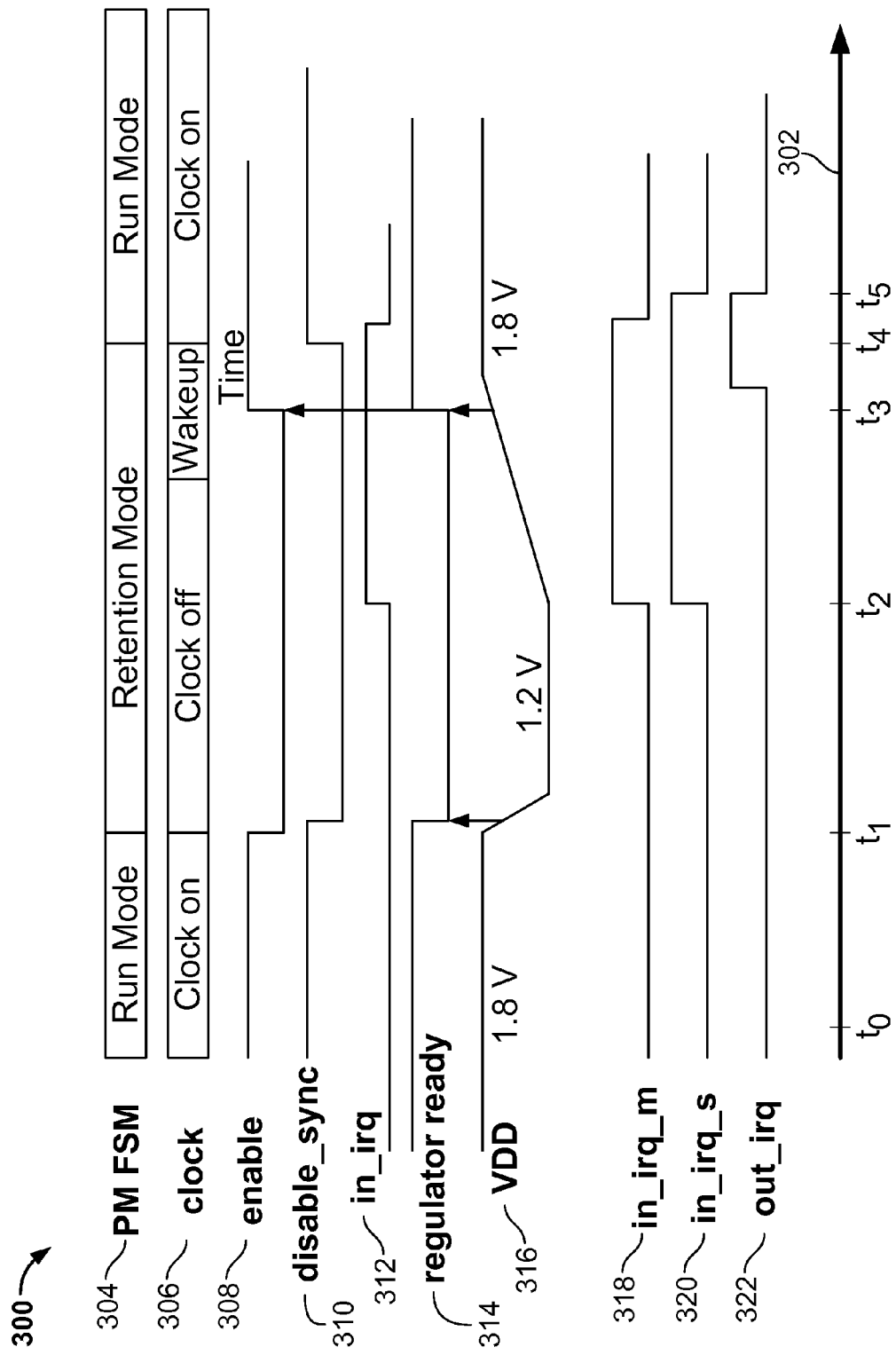
FIG. 3 is an example timing diagram illustrating an example scenario of operation of the microcontroller system of FIG. 2.

FIG. 3 is an example timing diagram 300 illustrating an example scenario of operation of the microcontroller system 200 of FIG. 2. The timing diagram illustrates a number of events along a timeline 302.

The first row 304 of the timing diagram illustrates the state of the power manager finite state machine. The next row 306 illustrates the state of the clock. The next row 308 illustrates the "enable" signal from the power manager to the interrupt delaying module. The next row 310 illustrates the synchronous "disable_sync" signal from the power manager to the interrupt delaying module.

The next row 312 illustrates the "in_irq" signal that represents an interrupt from an interrupt source to the interrupt delaying module. The next row 314 illustrates the "regulator ready" signal from the regulator. The next row 316 illustrates the system voltage from the regulator, VDD.

The next row 318 illustrates an "in_irq_m" signal from the output of the second flip-flop 216 to the input of the first flip-flop 214 and the input of the multiplexer. The next row 320 illustrates an "in_irq_s" signal from the output of the first flip-flop 214 to the input of the first AND gate 220. The next row 322 illustrates the output of the first AND gate, which eventually provides the delayed interrupt to the interrupt controller.

At time t0, the power manager finite state machine has configured the microcontroller system to operate in the run mode. The clock is on and the regulator is ready and providing 1.8V. At time t1, the power manager finite state machine configures the microcontroller to enter the retention mode. The regulator drops VDD to 1.2 V and the regulator_ready, enable, and disable_sync signals all fall to a logic "0" level. The clock is frozen.

At time t2, the interrupt source generates an interrupt, and the in_irq signal rises to a logic "1" level. The in_irq_m and in_irq_s signals also rise because they are asynchronously set. The regulator begins raising VDD from 1.2V to 1.8V. The out_irq signal remains at a logic "0" level, and the interrupt delaying module is holding the interrupt and not releasing the interrupt to the interrupt controller. The clock begins waking when VDD reaches a certain voltage.

At t3, VDD reaches a substantial fraction of the 1.8V target voltage, and the regulator_ready signal rises. In response, the enable signal rises, and soon after the out_irq signal rises to release the interrupt to the interrupt controller. There is no metastability issue for the interrupt controller because the clock is still frozen. At t4, the clock wakes, the disable_sync signal rises, and then in response, the in_irq signal and the in_irq_m and in_irq_s signals fall. At t5, the out_irq signal falls, and the interrupt controller has received the interrupt.

Example Testing Flowchart

Figure 4:
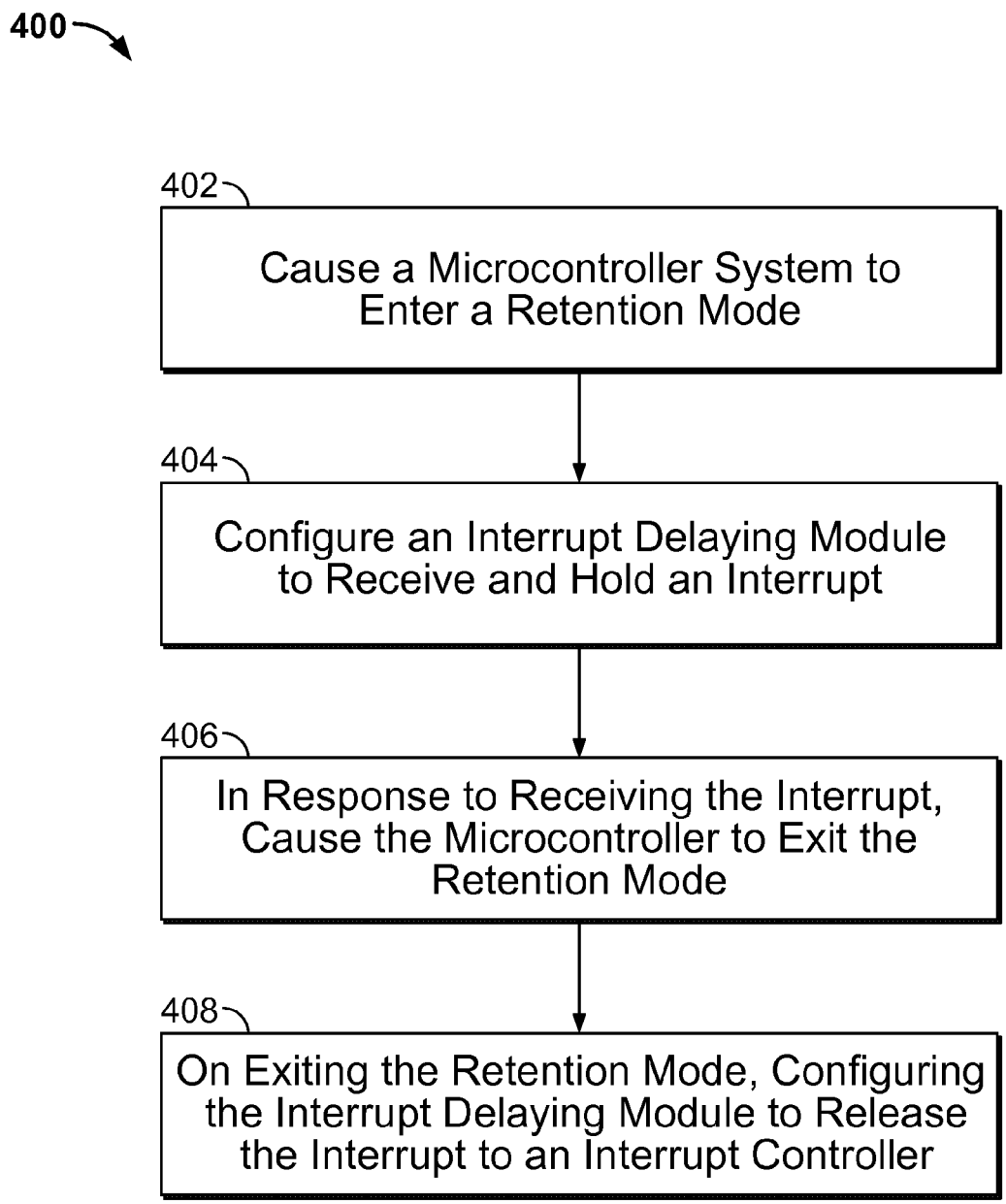
FIG. 4 is a flow diagram of an example process performed by a power manager of a microcontroller system.

FIG. 4 is a flow diagram of an example process 400 performed by a power manager of a microcontroller system. The microcontroller system can be the microcontroller system 100 of FIG. 1.

The power manager causes the microcontroller system to enter a retention mode (402). In some implementations, the power manager freezes a system clock. In some implementations, the power manager causes a voltage regulator to provide a lower voltage.

During the retention mode, the power manager configures an interrupt delaying module to receive and hold an interrupt from an interrupt source (404). In response to receiving the interrupt, the power manager causes the microcontroller system to exit or partially exit the retention mode (406). In some implementations, the power manager causes the voltage regulator to provide a higher voltage.

Upon exiting the retention mode, the power manager configures the interrupt delaying module to release the interrupt, for example, to an interrupt controller coupled to a processor (408). In some implementations, the power manager receives a ready signal from a voltage regulator and provides an asynchronous enable signal to the interrupt delaying module in response to receiving the ready signal.

The power manager can then synchronously clear the enable signal after the clock wakes. The power manager can wake the clock in response to the ready signal. The interrupt delaying module can alternatively release the interrupt to another module, e.g., a module between the interrupt delaying module and the interrupt controller.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller system comprising:
    a processor;
    an interrupt controller coupled to the processor;
    a regulator configured to provide a lower voltage during a power saving mode and a higher voltage on exiting the power saving mode;
    a power manager coupled to the interrupt controller, the power manager including an interrupt delaying module; and
    an interrupt source coupled to the interrupt delaying module;
    wherein the power manager is configured to perform operations comprising:
        during the power saving mode, configuring the interrupt delaying module to receive an interrupt from the interrupt source and then hold the interrupt;
        in response to the interrupt delaying module receiving the interrupt, enabling an interrupt input signal in the interrupt delaying module and causing the microcontroller system to exit the power saving mode;
        receiving a ready signal from the regulator; and
        in response to receiving the ready signal, providing an enable signal to the interrupt delaying module and configuring the interrupt delaying module to release the interrupt to the interrupt controller based on the enabled interrupt input signal and the provided enable signal.

2. The microcontroller system of claim 1, wherein the operations further comprise, in response to the interrupt delaying module receiving the interrupt, causing the regulator to begin raising an output voltage from the lower voltage, and wherein the regulator is configured to provide the ready signal when the output voltage reaches a substantial fraction of the higher voltage.

3. The microcontroller system of claim 1, further comprising a clock coupled to the power manager and the interrupt controller, wherein the clock is frozen during the power saving mode, and wherein the clock is configured to provide a clock signal on exiting the power saving mode.

4. The microcontroller system of claim 3, wherein the power manager is configured to wake the clock after receiving the ready signal from the regulator.

5. The microcontroller system of claim 3, the operations further comprising:
    causing the microcontroller system to enter a sleep mode so that the regulator is providing the higher voltage and the processor is frozen, the sleep mode being different from the power saving mode; and
    during the sleep mode, configuring the interrupt delaying module to pass an additional interrupt from the interrupt source to the interrupt controller.

6. The microcontroller system of claim 5, wherein the interrupt controller is configured to wake the processor in response to receiving the additional interrupt.

7. The microcontroller system of claim 1, wherein the interrupt delaying module comprises first and second flip-flops coupled to the interrupt source and the power manager.

8. The microcontroller system of claim 7, wherein the first and second flip-flops are D flip-flops coupled to a clock.

9. The microcontroller system of claim 8, wherein the interrupt delaying module comprises a multiplexer, and wherein an output of the multiplexer is coupled to an input of the first flip-flop and an input of the multiplexer is coupled to an output of the first flip-flop, and wherein the output of the first flip-flop is coupled to an input of the second flip-flop.

10. A microcontroller system comprising:
    a processor;
    an interrupt controller coupled to the processor;
    a power manager coupled to the interrupt controller, the power manager including an interrupt delaying module; and
    an interrupt source coupled to the interrupt delaying module;
    wherein the power manager is configured to perform operations comprising:
        during the power saving mode, configuring the interrupt delaying module to receive an interrupt from the interrupt source and then hold the interrupt;
        in response to the interrupt delaying module receiving the interrupt, causing the microcontroller system to exit the power saving mode; and
        on exiting the power saving mode, configuring the interrupt delaying module to release the interrupt to the interrupt controller,
    wherein the interrupt delaying module comprises first and second flip-flops coupled to the interrupt source and the power manager, and wherein the first and second flip-flops are D flip-flops coupled to a clock,
    wherein the interrupt delaying module comprises a multiplexer, wherein an output of the multiplexer is coupled to an input of the first flip-flop and an input of the multiplexer is coupled to an output of the first flip-flop, and wherein the output of the first flip-flop is coupled to an input of the second flip-flop, and
    wherein the interrupt delaying module comprises first and second logic gates, and wherein the first logic gate comprises a first input coupled to the power manager and configured to receive a synchronous disable signal from the power manager, and wherein the second logic gate comprises a first input coupled to the power manager and configured to receive an asynchronous enable signal from the power manager, and wherein an output of the second logic gate is coupled to a second input of the first logic gate, and wherein an output of the first logic gate is coupled to the multiplexer, and wherein an output of the second flip-flop is coupled to a second input of the second logic gate.

11. A method performed by a power manager of a microcontroller system, the method comprising:
    causing the microcontroller system to enter a power saving mode;
    during the power saving mode, configuring an interrupt delaying module to receive an interrupt from an interrupt source and then hold the interrupt;
    in response to the interrupt delaying module receiving the interrupt, enabling an interrupt input signal in the interrupt delaying module and causing the microcontroller system to exit the power saving mode;
    receiving a ready signal from a regulator; and
    in response to receiving the ready signal, providing an enable signal to the interrupt delaying module and configuring the interrupt delaying module to release the interrupt to an interrupt controller coupled to a processor based on the enabled interrupt input signal and the provided enable signal.

12. The method of claim 11, wherein the regulator is configured to provide a lower voltage during the power saving mode and a higher voltage on exiting the power saving mode,
    wherein causing the microcontroller system to exit the power saving mode comprises causing the regulator to begin raising an output voltage from the lower voltage in response to the interrupt delaying module receiving the interrupt, and
    wherein the regulator is configured to provide the ready signal when the output voltage reaches a substantial fraction of the higher voltage.

13. The method of claim 11, wherein configuring the interrupt delaying module to receive and hold the interrupt comprises synchronously clearing the enable signal to the interrupt delaying module.

14. The method of claim 11, wherein causing the microcontroller to enter the power saving mode comprises freezing a clock, and wherein the method further comprises, in response to receiving the ready signal, waking the clock.

15. The method of claim 14, further comprising, after waking the clock, synchronously providing a disable signal to the interrupt delaying module.

16. The method of claim 11, wherein causing the microcontroller to enter the power saving mode comprises configuring the regulator to provide a lower voltage, and wherein the method further comprises, on exiting the power saving mode, configuring the regulator to provide a higher voltage.

17. The method of claim 16, further comprising:
    causing the microcontroller system to enter a sleep mode so that the regulator is providing the higher voltage and the processor is frozen, the sleep mode being different from the power saving mode; and
    during the sleep mode, configuring the interrupt delaying module to pass an additional interrupt from the interrupt source to the interrupt controller.

18. The method of claim 11, wherein the interrupt delaying module comprises first and second flip-flops coupled to the interrupt source and the power manager.

19. The method of claim 18, wherein the first and second flip-flops are D flip-flops coupled to a clock.

20. The method of claim 19, wherein the interrupt delaying module comprises a multiplexer, and wherein an output of the multiplexer is coupled to an input of the first flip-flop and an input of the multiplexer is coupled to an output of the first flip-flop, and wherein the output of the first flip-flop is coupled to an input of the second flip-flop.

* * * * *